(12) United States Patent
Esser et al.

(10) Patent No.: US 7,347,546 B2
(45) Date of Patent: *Mar. 25, 2008

(54) INDIVIDUAL SINGLE-VISION SPECTACLE LENS

(75) Inventors: Gregor Esser, Munich (DE); Werner Mueller, Otisheim (DE); Herbert Pfeiffer, Munich (DE); Helmut Altheimer, Baisweil-Lauchdorf (DE); Peter Baumbach, Muechen (DE); Walter Haimerl, Muechen (DE); Jochen Brosig, Grunwald (DE)

(73) Assignee: Rodenstock GmbH, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/568,677

(22) PCT Filed: Aug. 17, 2004

(86) PCT No.: PCT/EP2004/009228

§ 371 (c)(1),
(2), (4) Date: Aug. 15, 2006

(87) PCT Pub. No.: WO2005/019904

PCT Pub. Date: Mar. 3, 2005

(65) Prior Publication Data

US 2007/0008488 A1    Jan. 11, 2007

(30) Foreign Application Priority Data

Aug. 19, 2003   (DE)   ............... 103 38 033

(51) Int. Cl.
*G02C 7/02*   (2006.01)
(52) U.S. Cl. .................... 351/159; 351/177
(58) Field of Classification Search ........ 351/159, 351/176, 177
See application file for complete search history.

(56) References Cited

U.S. PATENT DOCUMENTS

2003/0048410 A1   3/2003   Baumbach et al.

FOREIGN PATENT DOCUMENTS

| DE | 100 01 726.6 | 1/2000 |
|---|---|---|
| DE | 100 20 244.6 | 4/2000 |
| DE | 100 21 047.3 | 4/2000 |
| EP | 0 880 046 A1 | 11/1998 |
| WO | WO 97/15857 A2 | 5/1997 |
| WO | WO 97/35224 | 9/1997 |
| WO | WO 01/44859 A2 | 6/2001 |
| WO | WO 01/57584 A2 | 8/2001 |

OTHER PUBLICATIONS

English Translation of Written Opinion of the International Searching Authority (Six (6) pages).

*Primary Examiner*—Scott J. Sugarman
*Assistant Examiner*—Darryl J. Collins
(74) *Attorney, Agent, or Firm*—Crowell & Moring LLP

(57) ABSTRACT

The invention relates to a method of producing a single-strength spectacle lens while taking into account an individual spectacle wearer's data, the single-strength spectacle lens having a rotationally symmetrical base surface and a rotationally symmetrical aspherical or atoric prescription surface, comprising the following steps:

Acquisition of an individual spectacle wearer's data;
  selection of a spectacle lens blank with a predetermined base surface from a group of spectacle lens blanks; and
  calculation and optimization of the prescription surface while taking into account at least a part of the individual spectacle wearer's data in addition to an adaptation of the dioptric effect by the prescription surface to the spectacle wearer's prescription.

The invention also relates to a corresponding system for producing a single-strength spectacle lens and to an individual single-strength spectacle lens.

18 Claims, 4 Drawing Sheets

INDIVIDUAL SINGLE-VISION SPECTACLE LENS

BACKGROUND AND SUMMARY OF THE INVENTION

The present invention relates to a method of producing a single-vision spectacle lens, a system for producing a single-vision spectacle lens as well as an individual single-vision spectacle lens.

Single-vision spectacle lenses, in which, in contrast to progressive spectacle lenses, the dioptric effect nominally does not change along a vertical section, are well known in the state of the art (compare particularly DE 100 01 726, DE 100 20 244, DE 100 21 047 and EP 96 945 697 of Rodenstock GmbH, München, Germany). Such modern single-vision lenses with aspherical or atoric surfaces have excellent optical imagining characteristics while the cosmetic characteristics are advantageous.

In the prior, so-called progressive lenses are also known in which the refractive power differs between a far part and a near part, between which the so-called progression zone is arranged in which the effect of the spectacle lens increases continuously from that of the far part to that of the near part. For progressive spectacle lenses of this type, it was suggested, for example, in EP 0 880 046 A1 of Seiko Epson Corporation, Tokyo, Japan, or in WO 01/57584 of Rodenstock GmbH, München, Germany, to take into account individual data of a certain spectacle wearer when designing and manufacturing the progressive lens.

However, such a taking into account of an individual spectacle wearer's or customer's data when producing progressive spectacle lenses requires a technologically high-expenditure design and manufacturing process in order to manufacture such individual progressive lenses within reasonable delivery times while the manufacturing costs are economically acceptable. Spectacle lens blanks (also called "blanks" or semifinished products), in the case of which, for example, only the non-progressive front surface is finished, are used as a starting point for the production of such progressive lenses. However, the eye-side back surface, which provides the progressive effect, in the event that the astigmatic effect also is to be applied by the progressive surface, because of the large number of necessary progressive surfaces, cannot be "stocked up" as a standard product. Instead, such progressive lenses have to be individually produced to order. Thus, in the case of approximately 9 to 12 additions for correcting presbyopia and 3 to 6 base curves for the rough covering of spherical defective vision and 20 cylinder values in the case of 90 axis positions, already more than 100,000 different progressive surfaces are required.

An individual manufacturing of the progressive surface is therefore often necessary in the case of modern progressive spectacle lenses. Since the progressive surface has to be individually manufactured for certain spectacle wearers in any case, it was suggested in the documents to also take into account an individual spectacle wearer's data (customer's data) when computing and optimizing the individual progressive surface.

However, in comparison with the described progressive lenses, in the case of single-vision lenses, considerably fewer surface designs have to be represented in order to arrive at a correspondingly satisfactory covering of a spectacle wearer's prescription. Accordingly, it was not considered necessary in the prior art and was even regarded to be disadvantageous to take into account an individual spectacle wearer's data (customer's data) when calculating and optimizing a single-vision spectacle lens because such an approach would supposedly only result in slight optical improvements but considerably increase the cost of the spectacle lens and thus lead to a supposedly economically not acceptable price/performance ratio.

An object of the present invention to provide a method of producing a single-vision spectacle lens which, in comparison to conventional single-vision spectacle lenses, has improved optical characteristics and a better wearing comfort. It also an object of the invention to indicate a system for producing a corresponding spectacle lens as well as a corresponding spectacle lens.

These objects have been achieved by a described hereinbelow, a system utilizing devices for carrying out such method, and a single-vision spectacle lens produced thereby.

According to the present invention, a method of producing a single-vision spectacle lens and taking into account an individual spectacle wearer's data, the single-vision spectacle lens having a rotationally symmetrical base surface and a rotationally symmetrical aspherical or atoric prescription surface, includes:

acquisition of an individual spectacle wearer's data;

selection of a spectacle lens blank (that is, of a blank with a predetermined base surface and a predetermined refractive value D1 of the surface in the vertex); and calculation and optimization of the prescription surface while taking into account at least a part of the individual spectacle wearer's data in addition to an adaptation of the dioptric effect by the prescription surface to the spectacle wearer's prescription.

The present invention is based on the recognition that surprisingly, also in the case of single-vision spectacle lenses, by taking into account an individual spectacle wearer's data when calculating and optimizing the prescription surface, significant improvements can be achieved particularly of the optical characteristics and of the wearing comfort of such an individual single-vision spectacle lens. These improvements, in comparison to the conventional single-vision lenses, justify increased production costs. The invention therefore overcomes a prejudice firmly anchored in the prior art, according to which taking into account an individual spectacle wearer's data makes sense only in the case of progressive spectacle lenses whose large variety of different surfaces which are to be represented oftentimes require an individual production of the progressive surface in any event.

Thus, according to the method of the present invention, single-vision spectacle lenses are produced which are individually adapted to a certain previously known spectacle wearer. In this case, an individual spectacle wearer's data (customer's data) of the known spectacle wearer are taken into account which were acquired before the calculating and optimizing process of the prescription surface. As will be shown in detail in the following, such spectacle wearer's data may be a spectacle wearer's data specific to the eyes or a spectacle wearer's data specific to the application (for example, the field of use of the single-vision spectacle lens, the shape of the rim, etc.).

According to the present invention, the production of the (individual) single-vision spectacle lens takes place as a two-step process. After the acquisition of the individual spectacle wearer's data of the specific spectacle wearer, a spectacle lens blank with a predetermined base surface is first selected from a group of prefabricated spectacle lens blanks, that is, of semifinished spectacle lens products with a prefabricated base surface with a predetermined refractive value of the surface in the vertex. Taking into account at least a portion of the acquired individual spectacle wearer's data, the prescription surface in the usage position is then calculated and optimized individually for the spectacle wearer. In each case, this comprises a dioptric effect adaptation to the spectacle wearer's prescription by the prescription surface, the dioptric effect comprising particularly the spherical prescription, the astigmatic prescription, including the axis position, and the prismatic prescription, including the base position. In addition to this adaptation of the dioptric effect by the prescription surface to the spectacle wearer's prescription, an optimization of the prescription surface takes place while taking into account at least some additional individual spectacle wearer data.

The front surface is preferably the base surface, and the back surface of the single-vision spectacle lens is the prescription surface. Preferably, the base surface is a spherical surface and the prescription surface is a surface without symmetries.

According to a currently preferred embodiment of the method of the invention, the individual spectacle wearer's data are taken into account during the step of selecting the spectacle lens blank. If, for example, the single-vision spectacle lens is to be used in spectacles intended for sports, individual application-specific spectacle wearer data can be included in the manufacturing to such an extent that a front surface is selected which has a considerable deflection or rim disk angle. During the step of selecting the spectacle lens blank, such a course of the base surface can thereby be taken into account.

According to another currently preferred embodiment, the individual spectacle wearer's data comprise application fields of the wearer of the spectacle for the use of the single-vision spectacles. In particular, the application field may be sports. Spectacles used for sports are distinguished in that they have large deflections (such as base curves), and therefore a very pronounced curvature of the front surface, and a large rim disk angle. The rim disk angle, often also called a lateral angle of tilt or tilt angle, in this case, is the angle between the optical axis of a spectacle lens under the focusing line of the eye in the primary position.

When the single-vision spectacle lens is used in the field of sports, the lateral tilt preferably amounts to more than 5 degrees, preferably more than 10 degrees, and the base curve of the front surface amounts to more than 6 dpts, preferably more than 10 dpts. In this case, the lateral tilt may also assume very high values of up to particularly 30 degrees. In the case of such a lens for sports spectacles, special advantages occur according to the invention by taking into account the high lateral tilt as well as the high base curve during the manufacturing, which result in considerably improved optical characteristics compared with corresponding conventional sports spectacle lenses. In particular, in the case of a preferred lens for sports spectacles produced according to the invention, it can be achieved that the optical aberrations in the usage position are below 0.5 dpts over the entire range of the spectacle lens.

With respect to the technical terminology, reference is made particularly to "Optik und Technik der Brille" ("Optics and Technology of Spectacles") by Heinz Diepes and Ralf Blendowske, Optische Fachveröffentlichung GmbH, Heidelberg, 2002, whose corresponding explanations, to this extent, represent an integral disclosure component of the present application and are incorporated by reference herein. Additional conceivable fields of application are, for example, near-vision spectacles for musicians or spectacles for watchmakers or precise mechanical work which are optimized for the extremely close range.

The individual spectacle wearer's data preferably comprise the interpupillary distance, the lateral tilt, the rim disk angle, the auricular adaptation of the rim and/or the spectacle wearer's habitual head posture.

According to another currently preferred embodiment, the individual spectacle wearer's data comprise a centering demand, particularly the eye rotation point demand, the reference point demand or the visual field demand.

Preferably, the individual spectacle wearer's data comprise the eye rotation point distance and/or the overall length of the spectacle wearer's eye.

The individual spectacle wearer's data preferably comprise the corneal vertex distance HSA.

According to still another preferred embodiment, the individual spectacle wearer's data comprise a typical object distance of objects to be viewed by way of the single-vision spectacle lens, in which case the object distance may particularly be a function of the viewing point through the single-vision spectacle lens. The single-vision spectacle lens is, for example, constructed such that a portion of the prescription surface which is at the top in the usage position is optimized for the far range and a bottom portion is optimized for the near range without, however, a change in the effect as it takes place in the case of a progressive spectacle lens. The individual spectacle wearer's data preferably comprise the shape of the rim of the spectacle rim selected by the spectacle wearer. As a result, it can be ensured, particularly in the case of "+" lenses, that, for the production of the individual single-vision lens, crude round lenses are selected which have only the minimally required thickness.

According to yet another currently preferred embodiment, the individual spectacle wearer's data comprise the type of the ametropia, and during the step of calculating and optimizing the prescription surface, the design definition takes place according to the type of ametropia (myopia/hyperopia/presbyopia). As a result, particularly the different fields of vision are taken into account on the basis of the prismatic effect.

The individual spectacle wearer's data preferably comprise the spectacle wearer's binocular characteristics, particularly in the case of anisometropia, heterophoria, microanomalous retinal correspondence or alternating vision.

According to another preferred embodiment, the individual spectacle wearer's data comprise prismatic components of the prescription.

The individual spectacle wearer's data preferably further comprise the physiological demands of the wearer of the spectacles, particularly the initial sight, his visual habits and models for the movement of the eye and head.

The individual spectacle wearer's data preferably still further comprise the spectacle wearer's visual acuity. Thus, in the case of a spectacle wearer who only has a lower visual acuity, more optical aberrations can be permitted and desired definitions can correspondingly be selected which are chosen, for example, more in favor of cosmetic characteristics of the spectacle lens. On the other hand, in the case of spectacle wearers whose vision is subjected to high demands (for example, watchmakers), the desired definitions can be selected such that a central range is provided which has only the most minimal optical aberrations.

The number of base surfaces of the spectacle lens blanks preferably amounts to approximately 5 to 25.

According to another aspect of the invention, a system for producing a single-vision spectacle lens, which has a rotationally symmetrical base surface and a rotationally symmetrical aspherical or atoric prescription surface, while taking into account an individual spectacle wearer's data, comprises:

acquisition devices for acquiring an individual spectacle wearer's data, selection devices for selecting a spectacle lens blank with a predetermined base surface from a group of spectacle lens blanks; and calculating and optimizing devices for calculating and optimizing the prescription surface while taking into account at least a portion of the individual spectacle wearer's data in addition to an adaptation of the dioptric effect by the prescription surface to the spectacle wearer's prescription.

According to another aspect of the invention, an individual single-vision spectacle lens for a certain spectacle wearer has a rotationally symmetrical base surface and a rotationally symmetrical aspherical or atoric prescription surface, the prescription surface being constructed for taking into account at least a portion of an individual spectacle wearer's data.

The individual single-vision spectacle lens is preferably a lens for sports spectacles, which has a lateral tilt of more than 5 degrees, preferably more than 10 degrees, and a base curve of more than 6 dpts.

Other objects, advantages and novel features of the present invention will become apparent from the following detailed description of the invention when considered in conjunction with the accompanying drawings.

DETAILED DESCRIPTION OF THE DRAWINGS

Figure 1:
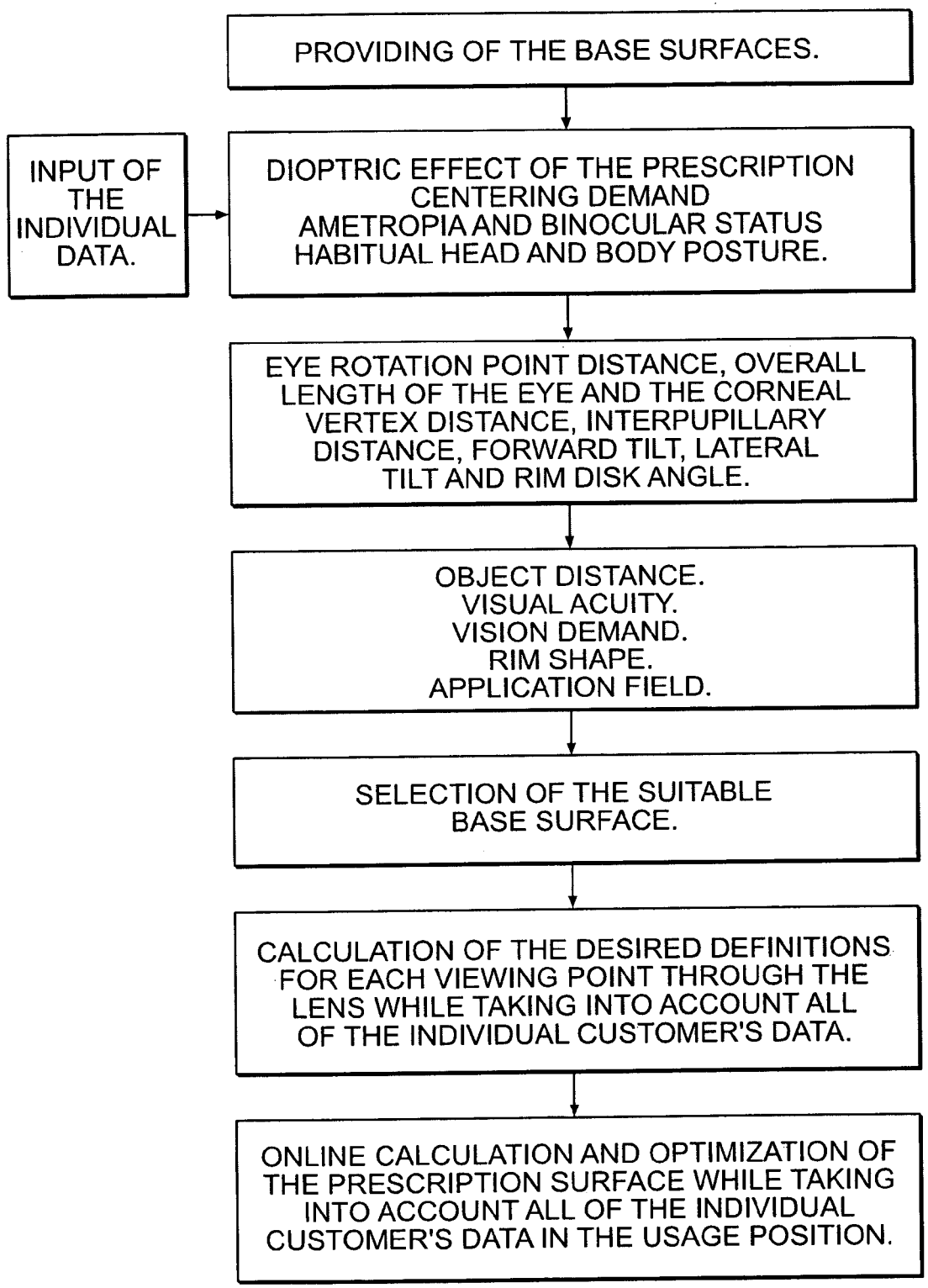
FIG. 1 is a simplified flow chart of a preferred method according to the invention for producing an individual single-vision lens.

The schematic flow chart of FIG. 1 shows a currently preferred embodiments of a production process according to the invention for producing an individual single-vision lens which process can be divided into five essential steps. First, a certain number of spectacle lens blanks with predetermined base surfaces are provided in Step 1. For example, approximately 5 to 25 different base surfaces can be provided. Such spectacle lens blanks, which are also called semifinished spectacle lens products, are completely finished only on one lens side; that is, they have only one finished optical surface. A so-called prescription grinding shop machines the other lens side, in the following called prescription surface, according to corresponding definitions.

The eye-side surface, that is, the back surface of the single-vision lens, is preferably individually finished as the prescription surface. The base curve, which is also called a basic curve, is therefore the nominal refractive value of the front surface of the single-vision lens.

As illustrated in Step 2 of FIG. 1, according to the preferred production process of the invention of the individual single-vision lens, the input of individual data then takes place, which individual data are also called the individual spectacle wearer's data or customer's data in the following. These individual spectacle wearer's data may also be eye- or application-specific information which is assigned to a certain spectacle wearer for whom the individual single-vision spectacle lens is to be manufactured. Such spectacle wearer's data can comprise many different individual characteristics or parameters as well as particularly usage-specific additional information concerning the spectacle wearer. In this context, the dioptric effect of the spectacle wearer's prescription is naturally of central importance. The centering demand, the ametropia and the binocular status as well as the habitual head and body posture should also be mentioned. Furthermore, the individual spectacle wearer's data may comprise the eye rotation point distance, the overall length of the eye and the corneal vertex distance, the interpupillary distance, the forward tilt, the lateral tilt and the rim disk angle.

In addition, the object distance typically to be expected, as well as the field of application, that is, the application-specific spectacle wearer's data can be taken into account as the individual spectacle wearer's data. The spectacle wearer's visual acuity or vision demand can also be used in the manufacturing process of the individual prescription surface so that, for example, if the visual acuity is only reduced, cosmetic factors can be entered into the design process to a greater degree.

In addition, the rim shape of the spectacle rim can be included in the manufacturing process of the single-vision spectacle lens in order to be able, for example, in the case of "+" lenses, to select a crude round lens with the smallest possible center thickness. Preferably, a suitable base surface or a suitable spectacle lens blank is selected while taking into account at least a portion of the above-mentioned individual spectacle wearer's data (Step 3). For example, the rim disk angle may be important when selecting the suitable base surface or spectacle lens blank, particularly when the spectacle lens is to be used as a considerably curved lens for sports spectacles.

In a subsequent step 4, for each viewing point through the single-vision spectacle lens, desired definitions are calculated while taking into account preferably all, but at least a portion of the above-mentioned individual customer's or spectacle wearer's data. In a subsequent calculating and optimizing step, which particularly may be so-called "online steps", the prescription surface to be manufactured individually, while taking into account preferably all the individual spectacle wearer's data but at least a portion of the individual spectacle wearer's data, is calculated or optimized in the usage position.

A preferred embodiment of the production method according to the invention as well as characteristics of a preferred individual single-vision lens according to the invention will be described in the following by way of a single-vision lens with a large lateral tilt or a large rim disk angle, as it is used particularly for sports spectacles.

Lenses for sports spectacles are distinguished in that, in comparison to normal spectacle lenses, they often have large deflections, that is, very pronounced curvatures of the front surface, and large rim disk angles. The basis curve selected for such spectacle lenses regularly amounts to over 10 dpts, while, for normal spectacle lenses without correction, it is typically below 6 dpts. The rim disk angles of such sports spectacle lenses are regularly above 10 degrees and thus also above corresponding values of normal spectacle lenses, which typically have rim disk angles of below 5 degrees.

However, these considerably increased values for the base curve and the rim disk angles have a disadvantageous effect on the imaging characteristics of the spectacle lens. As concerns sports spectacles without a correction effect, these problems have been known for a long time. A number of patent applications and patents therefore exist which relate to solving this problem. At this point reference need be made only to WO 99/525480 as well as U.S. Pat. Nos. 5,648,832; 5,969,789; and 5,689,323.

Figure 2:
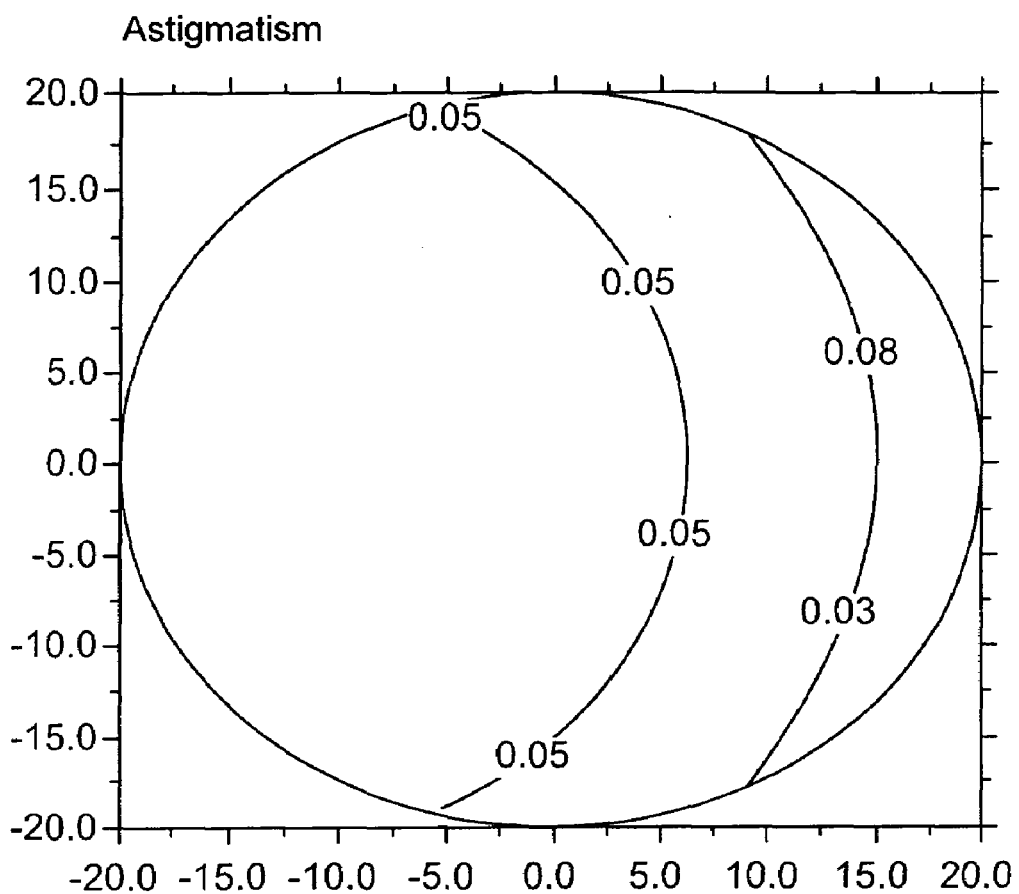
FIG. 2 is a contour line representation of the astigmatic defect of a conventional spectacle lens without a correction effect with a base curve of 6.5 dpts and a rim disk angle of 30 degrees.

As an example, FIG. 2 is a contour line representation of the astigmatic defect (spectacle lens and eye combination) of a conventional (sports) spectacle lens without a correction effect with a base curve of 6.5 dpts, which has a high rim disk angle of 30 degrees. The contour lines are shown for an astigmatic defect of 0.05 dpts (left contour line in FIG. 2) and 0.10 dpts (right contour line in FIG. 2). In the case of a horizontal distance of x=15 from the optical center, the astigmatic defect amounts to a tolerable 0.10 dpts.

However, in the case of spectacle lenses with a correction effect, a considerably greater negative influence of the high rim disk angle takes place upon the imaging characteristics because, in the case of a spectacle lens with the effect of 0 dpts, for example, the prismatic effect changes only minimally over the spectacle lens as illustrated by the examples in FIGS. 3(a) to (d).

FIGS. 3(a) to (d) are contour line representations of the astigmatic defect of different single-vision lenses. All single-vision lenses have a dioptric total effect Sph=+6.0 dpts, the front surface having a refractive value of D1=6.5 dpts of the surface in the vertex. The calculations relate to a refractive index of n=1.597 of the spectacle lens.

Figure 3A:
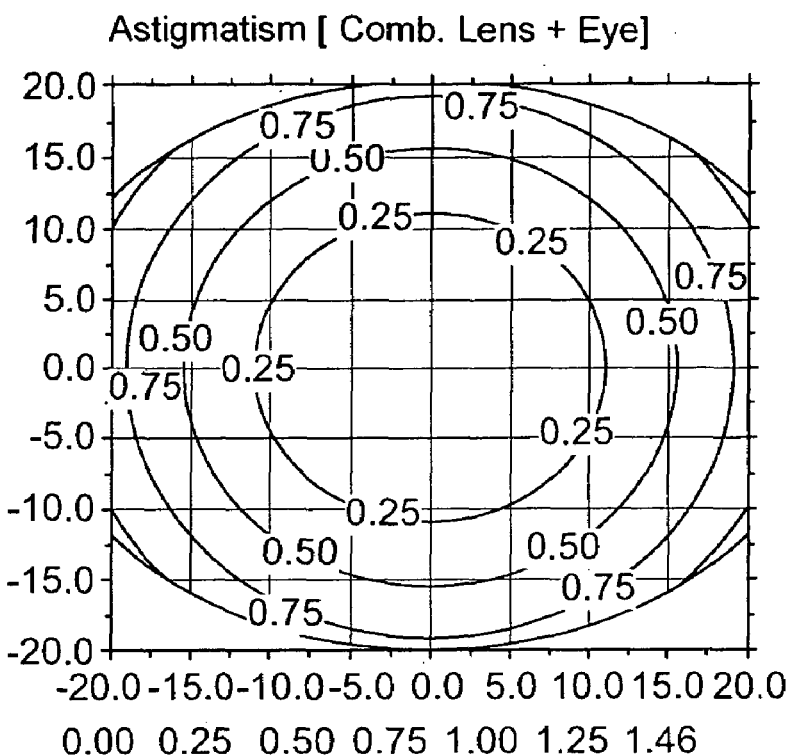
FIG. 3(a) is a contour line representation of the astigmatic defect of a conventional spherical spectacle lens without tilting.

FIG. 3(a) shows a conventional spherical single-vision lens without tilting. The spectacle lens is a conventional single-vision lens of Rodenstock GmbH, which is sold under the trade name "Perfalit". The astigmatic defect (combination of the spectacle and the eye) is shown as a contour line representation, the circular contour lines from the inside to the outside amounting to 0.25 dpts, 0.50 dpts, 0.75 dpts and 1.00 dpts. As illustrated in FIG. 3(a), the astigmatic defect of the lens and eye combination in the area of the vertex is comparatively low.

Figure 3C:
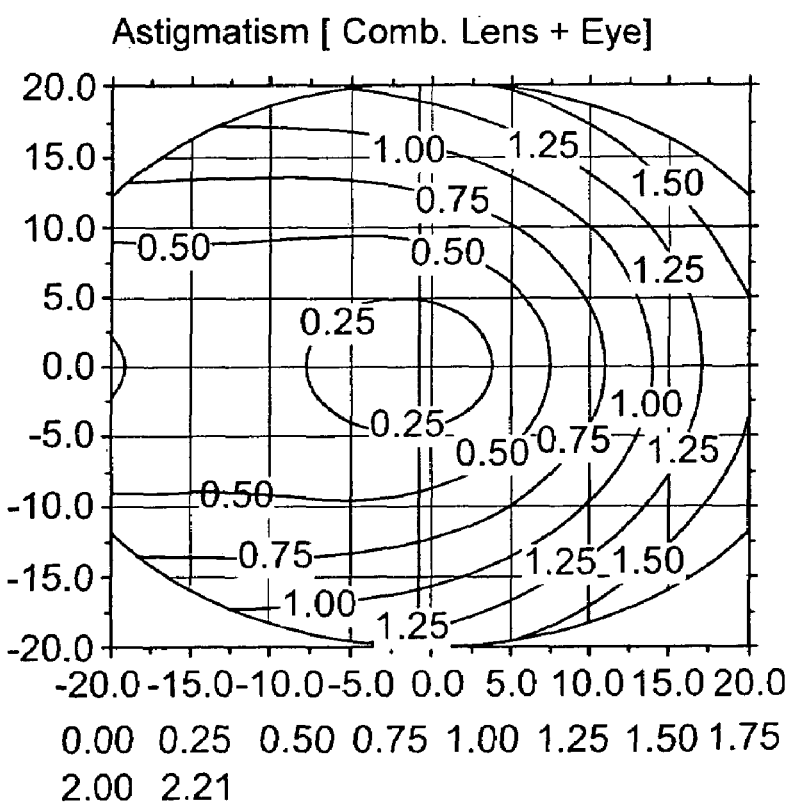
FIG. 3(c) is a contour line representation of the astigmatic defect of a conventional toric single-vision lens with a tilting of 15° C.
Figure 3B:
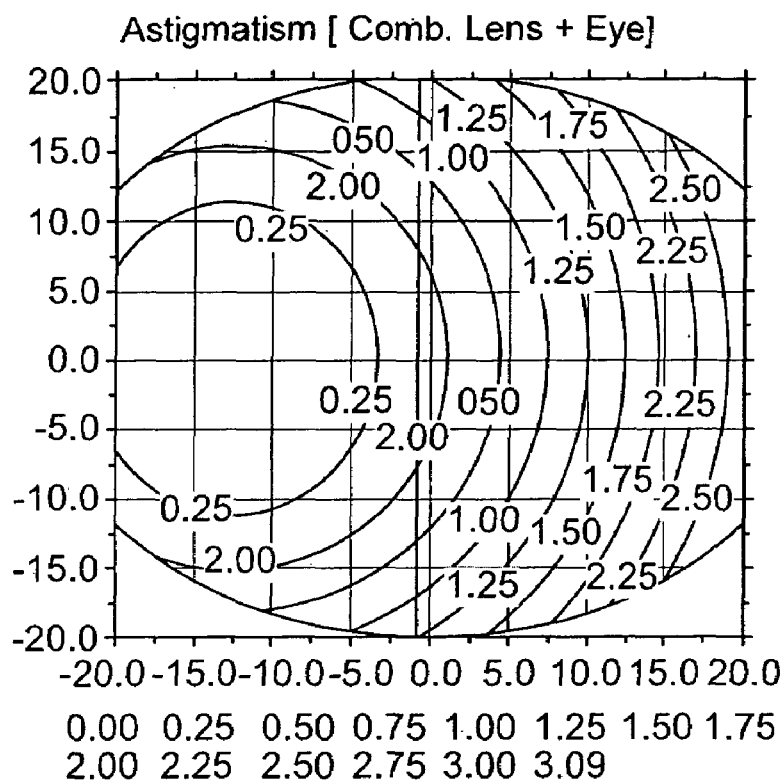
FIG. 3(b) is a contour line representation of the astigmatic defect of the spectacle lens illustrated in FIG. 2(a) with a tilting of 15° C.

However, if—as illustrated in FIG. 3(b)—the conventional single-vision lens illustrated in FIG. 3(a) is tilted by an angle of 15° C. along a vertical axis, the imagining characteristics are considerably impaired which, in turn, is shown in the contour line representation of the astigmatic defect (contour line distance 0.25 dpts). Even at a horizontal distance of x=15 mm from the optical center, an astigmatic defect of 2.00 dpts occurs which is therefore considerably above the corresponding value of the spectacle lens without a correction effect illustrated in FIG. 2. In the center of the spectacle lens, the astigmatic defect also already amounts to 0.4 dpts and thus results in a pronounced fogginess of the optical image.

In view of the problem described by way of FIG. 3(b), it was suggested in the prior art to use a toric surface instead of the spherical surface. As a comparison, such a known spectacle lens is illustrated in FIG. 3(c), in which case the rim disk angle again amounts to 15° C. By using a toric surface, the astigmatic defect is corrected at least in the center and is improved also in the periphery. However, in the case of a horizontal distance x=15 mm from the optical center, the astigmatic defect still amounts to an unacceptable 1.00 dpts, so that the imaging characteristics in the periphery continue to be unsatisfactory.

Figure 3D:
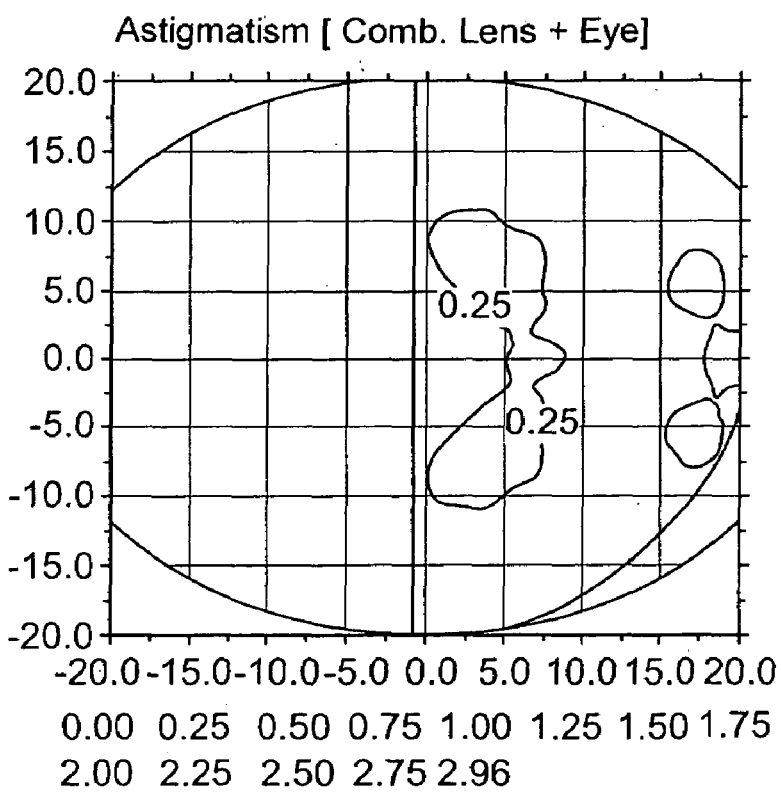
FIG. 3(d) is a contour line representation of the astigmatic defect of a preferred single-vision lens according to the invention which was calculated according to a preferred production process of the invention.

In contrast, FIG. 3(d) shows an individual single-vision spectacle lens, which the tilting was taken into account as an individual spectacle wearer's data when calculating and optimizing the individual prescription surface. The only contour line of the astigmatic defect visible in FIG. 3(d) is the 0.25 dpts contour line. In comparison to the imaging characteristics of the conventional single-vision lenses with large rim disk angles according to FIGS. 3(b) and 3(c), a considerable improvement of the imaging characteristics can therefore be recognized by the individual calculation and optimization of the prescription surface while taking into account the tilting angle, which again amounts to 15° C. Over the entire range, the astigmatic defect is below 0.5 dpts and in large areas even below 0.25 dpts in the case of the preferred spectacle lens according to the invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. Method for producing a single-strength spectacle lens while using an individual spectacle wearer's data, in which the single-strength spectacle lens having a rotationally symmetrical base surface selected from a number of base surfaces and a rotationally symmetrical aspherical or atoric prescription surface, comprising
   acquiring an individual spectacle wearer's data;
   selecting a spectacle lens blank with a predetermined based surface from a group of spectacle lens blanks, and
   calculating and optimizing the prescription surface while taking into account at least a portion of the individual spectacle wearer's data in addition to an adaptation of the dioptric effect by the prescription surface to the spectacle wearer's prescription,
   wherein the individual spectacle wearer's data comprise the spectacle wearer's application fields for use of the single-strength lens, including the application field of sports spectacles in which the lateral tilt of the single-strength spectacle lens amounts to more than 10 degrees and the base curve of the front surface amounts to more than 6 dpts.

2. Method according to claim 1,
   wherein the base surface is the front surface and the prescription surface is the back surface of the single-strength spectacle lens.

3. Method according to claim 1,
   wherein the individual spectacle wearer's data are taken into account during the step of selecting the spectacle lens blank.

4. Method according to claim 1, wherein the base surface is the front surface and the prescription surface is the back surface of the single-strength spectacle lens.

5. Method according to claims 1, wherein the individual spectacle wearer's data comprise at least one of interpupillary distance, the forward tilt, the lateral tilt, the rim disk angle, the auricular adaptation of the rim and the spectacle wear's habitual head posture.

6. Method according to claim 1, wherein the individual spectacle wearer's data comprise a centering demand, including the eye rotation point demand, the reference point demand or the visual field demand.

7. Method according to claim 1, wherein the individual spectacle wearer's data comprise at least one of the eye rotation point distance and the overall length of the spectacle wearer's eye.

8. Method according to claim 1, wherein the individual spectacle wearer's data comprise the corneal vertex distance.

9. Method according to claim 1, wherein the individual spectacle wearer's data comprise a typical object distance of objects to be viewed by the single-strength spectacle lens, wherein the object distance can include a function of a viewing point through the single-strength spectacle lens.

10. Method according to claim 1, wherein the individual spectacle wearer's data comprise rim shape.

11. Method according to claim 1, wherein the individual spectacle wearer's data comprise ametropia type and, during the calculating and optimizing of the prescription surface, design definition takes place according to the ametropia type.

12. Method according to claim 1, wherein the individual spectacle wearer's data comprise binocular characteristics, including anisometropia, heterophoria, microanomalous retinal correspondence or alternating vision.

13. Method according to claim 1, wherein the individual spectacle wearer's data comprise prescription prismatic components.

14. Method according to claim 1, wherein the individual spectacle wearer's data comprise a spectacle wearer's physiological demands, particularly including the initial sight, visual habits and models for eye and head movement.

15. Method according to claim 1, wherein the individual spectacle wearer's data comprise a spectacle wearer's visual acuity.

16. Method according to claim 1, wherein the number of base surfaces is approximately 5 to 25.

17. System for producing a single-strength spectacle lens which has a rotationally symmetrically base surface and a rotationally symmetrical aspherical or atoric prescription surface, and using an individual spectacle wearer's data, comprising acquisition devices for acquiring an individual spectacle wearer's data, selection devices for selecting a spectacle lens blank with a predetermined base surface from a group of spectacle lens blanks, and calculating and optimizing devices for calculating and optimizing the prescription surface while using at least a portion of the individual spectacle wearer's data in addition to an adaptation of the dioptric effect by the prescription surface to the spectacle wearer's prescription, wherein the individual spectacle wearer's data comprise a spectacle wearer's application fields for the use of the single-strength lens, including an application field of sports spectacles includes a lateral tilt of the single-strength spectacle lens of more than 10 degrees and the base curve of the front surface amounts to more than 6 dpts.

18. Individual single-strength spectacle lens for an individual spectacle wearer, which lens has a rotationally symmetrical base surface and a rotationally symmetrical aspherical or atoric prescription surface, and the prescription surface being constructed for taking into account at least a portion of an individual spectacle wearer's data, wherein the single-strength spectacle lens is a sports spectacle lens with a lateral tilt of more than 10 degrees and a base curve of more than 6 dpts.

* * * * *